US008478735B1

(12) United States Patent
Archambault et al.

(10) Patent No.: US 8,478,735 B1
(45) Date of Patent: Jul. 2, 2013

(54) METHOD AND SYSTEM FOR RANKING RESULTS AND PROVIDING LISTS OF EXPERTS FROM SOCIAL NETWORKS

(75) Inventors: Martin-Luc Archambault, Montreal (CA); André-Philippe Paquet, Verdun (CA)

(73) Assignee: Wajam Internet Technologies Inc., Montreal (CA)

( * ) Notice: Subject to any disclaimer, the term of this patent is extended or adjusted under 35 U.S.C. 154(b) by 25 days.

(21) Appl. No.: 13/352,957

(22) Filed: Jan. 18, 2012

Related U.S. Application Data (63) Continuation-in-part of application No. 13/346,342, filed on Jan. 9, 2012.

(51) Int. Cl.
*G06F 17/30* (2006.01)
(52) U.S. Cl.
USPC .......................................................... 707/711
(58) Field of Classification Search
USPC .......................................................... 707/711
See application file for complete search history.

(56) References Cited

U.S. PATENT DOCUMENTS

| 7,657,523 | B2 | 2/2010 | Ebanks |
| 7,827,176 | B2 | 11/2010 | Korte et al. |
| 7,958,104 | B2 | 6/2011 | O'Donnell |
| 8,019,743 | B2 | 9/2011 | Ebanks |
| 2009/0204601 | A1 | 8/2009 | Grasset |
| 2010/0153212 | A1* | 6/2010 | Stoll ........................... 705/14.52 |
| 2010/0250605 | A1* | 9/2010 | Pamu et al. ................... 707/783 |
| 2011/0055207 | A1* | 3/2011 | Schorzman et al. ........... 707/723 |
| 2011/0093498 | A1 | 4/2011 | Lunt et al. |
| 2011/0173198 | A1* | 7/2011 | Malleshaiah et al. ......... 707/737 |

OTHER PUBLICATIONS

Ranjit, "Multiagent Referral Systems: Maintaining and Applying Trust and Expertise Models", 2007, North Carolina State University.*
Horowitz & Kamvar, "The Anatomy of a Large-Scale Social Search Engine", Apr. 26-30, 2010, Raleigh, North Carolina, 10 pages.
Nelson, "Can adding friends on Facebook grow your brain?", Mother Nature Network, [online], [retrieved on Oct. 18, 2011].

* cited by examiner

*Primary Examiner* — James Trujillo
*Assistant Examiner* — Amresh Singh
(74) *Attorney, Agent, or Firm* — Benoît & Côté

(57) ABSTRACT

There is described a method and system for obtaining ranked search results including names of experts who are members of a social network and presenting the ranked search results to a user performing a search from a user interface of a user device. The user is registered on the social network and has connections thereon. The method comprises: indexing data representative of activities of the members on the social network to produce indexed activity data; receiving a search query relative to a subject along with a user identifier from the user device; using the search query and the user identifier, ranking members from the user's connections based on their activities on the social network related to the subject to obtain ranked experts for the subject; returning the names of ranked experts for the subject to the user device for presentation on the user interface.

15 Claims, 5 Drawing Sheets

METHOD AND SYSTEM FOR RANKING RESULTS AND PROVIDING LISTS OF EXPERTS FROM SOCIAL NETWORKS

CROSS-REFERENCE TO RELATED APPLICATIONS

This application is filed under 37 CFR 1.53(b) as a continuation-in-part application of U.S. patent application Ser. No. 13/346,342 filed Jan. 9, 2012. This application claims priority under 35 USC §120 of U.S. patent application Ser. No. 13/346,342 filed Jan. 9, 2012 and entitled "METHOD AND SYSTEM FOR AGGREGATING SEARCHABLE WEB CONTENT FROM A PLURALITY OF SOCIAL NETWORKS AND PRESENTING SEARCH RESULTS", the specifications of which are hereby incorporated herein by reference in its entirety.

BACKGROUND (a) Field

The subject matter disclosed generally relates to web search and presentation tools. More particularly, the disclosure relates to searching users' social networks.

(b) Related Prior Art

Tremendous changes have been occurring in the World Wide Web (the "Web") that influence our everyday lives. For example, online social networks have become the new meeting grounds. The development of such online social networks touch countless aspects of our everyday lives, providing instant access to people of similar mindsets, and enabling us to form partnerships with more people in more ways than ever before.

One of the more useful features of the Web and associated forms of communication such as e-mail, instant messaging, chat rooms, social networks and forums is the access to information that is useful in everyday work and social lives. There exists a substantial amount of information accessible on the Web. However, the information obtained by searching the Web is often generic and does not account for the searcher's level of education, location, socioeconomic status or the like. The response to a search of the Web is typically presented to the user by relevancy to the search request and/or other similar criteria which are based the wording of the search request. More often than not, the user is required to review a large amount of information that is not in fact relevant to the user's request. For instance, the user's background or knowledge in the subject matter may not match that of many of the search request results. Some information may be too detailed or technical while other information may be too generic. Likewise, if a user submits a query to a message board, blog, forum or similar on-line interactive site, many of the responses to the user's request will be from people who come from different backgrounds with different tastes and varying levels of knowledge in particular areas. This is particularly true for queries that are social in nature, wherein the responses to the request are more opinion than fact. Although some responses could be highly relevant, a large number of the responses can have low usefulness or relevance to the user's request. A user could also submit inquiries to their friends and family through e-mail, instant messaging or similar methods of communication. However, the responses may be sporadic, have no organization and may be repetitive of other requests made within the social network. Therefore, it is with respect to these considerations and others that the embodiments described herein were made.

There is therefore a need to change how people collect, find and share content on the Web.

SUMMARY

According to an embodiment, there is provided a method for obtaining ranked search results including names of ranked experts who are members of a social network and presenting the ranked search results to a user performing a search from a user interface of a user device. The user is registered on the social network and has connections thereon. The method comprises: indexing, by a social search server, data representative of activities of the members on the social network to produce indexed activity data; receiving, by the social search server, a search query relative to a subject along with a user identifier from the user device; using the search query and the user identifier, ranking, by the social search server, members from the user's connections based on their activities on the social network related to the subject to obtain the names of ranked experts for the subject; returning, by the social search server, the names of ranked experts for the subject to the user device; and presenting, on the user interface, the names of ranked experts for the subject.

According to an aspect, the search query is also received by a search engine server which returns customary search results and wherein the step of presenting, on the user interface, comprises presenting the names of ranked members concurrently with the customary search results returned by the search engine.

According to an aspect, the search engine is hosted on a website and wherein the data representative of activities of members of the social network on the social network is obtained from the social network hosted on a website that is different from the website hosting the search engine.

According to an aspect, the activities of members of the social network on the social network comprise at least one of: posting, liking, commenting on, providing links, adding to or modifying profile information, living in a given location, sharing content, providing articles, and providing videos on the subject.

According to an aspect, each of the activities is given a weight by type of activity whereby the ranking of the members will be influenced by the type of activity of the members.

According to an aspect, each of the activities is given a weight by the recency of the activity relating to the subject whereby the ranking of the members will be influenced by the recency of the activities of the members relating to the subject.

According to an aspect, the activities of a member are given a weight according to at least one of the number of connection of the member on the social network and the number of pieces of content shared by the member.

According to an aspect, an online status of the members is monitored and the ranking of the members is influenced by the online status of the members.

According to an aspect, the subject comprises a geographical location and the step of presenting comprises presenting the names of ranked members by type of recommendation for the geographical location.

According to an aspect, the type of recommendation comprises at least one of dining, shopping, sights to see, products and venues to check out.

According to an aspect, the step of determining the ranked members comprises performing a search on the indexed data specific to the user's connections and on indexed data specific to connections of the user's connections.

According to an aspect, the step of indexing data comprises indexing pieces of web content related to the users comprising at least one of photos, links, messages, comments, recommendations, and videos.

According to an aspect, the method further comprises creating a reserved space on the user interface and presenting the names of ranked members in the reserved space.

According to an aspect, the method further comprises creating an area on the user interface displaying a tool to ask a question about the subject to one or more of the ranked members.

According to an aspect, the tool comprises at least one of a box for entering the name or address of the ranked members and a box for entering the question about the subject.

According to an aspect, the social network comprises a plurality of social networks and the step of indexing data thereby comprises indexing data representative of activities of members of the plurality of social networks.

According to an embodiment, there is provided a social search server for obtaining ranked search results including names of ranked experts who are members of a social network and presenting the ranked search results to a user performing a search from a user interface of a user device, the user being registered on the social network and having connections thereon. The social search server comprises: an input for receiving a search query relative to a subject along with a user identifier; an indexing engine for indexing data representative of activities of the members on the social network to produce indexed activity data; a searching engine using the search query and the user identifier, ranking the members from the user's connections based on their activities on the social network related to the subject to obtain the names of ranked experts for the subject; and an output for returning, to the user device, the names of ranked experts to the user device for presentation on the user interface.

According to an embodiment, there is provided a method implemented on a social search server for obtaining ranked search results including names of members of a social network and presenting the ranked search results to a user performing a search from a user interface of a user device, the user being registered on the social network and having connections thereon. The method comprises: indexing data representative of activities of members on the social network to produce indexed activity data; receiving a search query relative to a subject along with a user identifier from the user device; using the search query and the user identifier, ranking members from the user's connections based on their activities on the social network related to the subject to obtain the names of ranked experts for the subject; and returning the names of ranked experts to the user device for presentation on the user interface.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
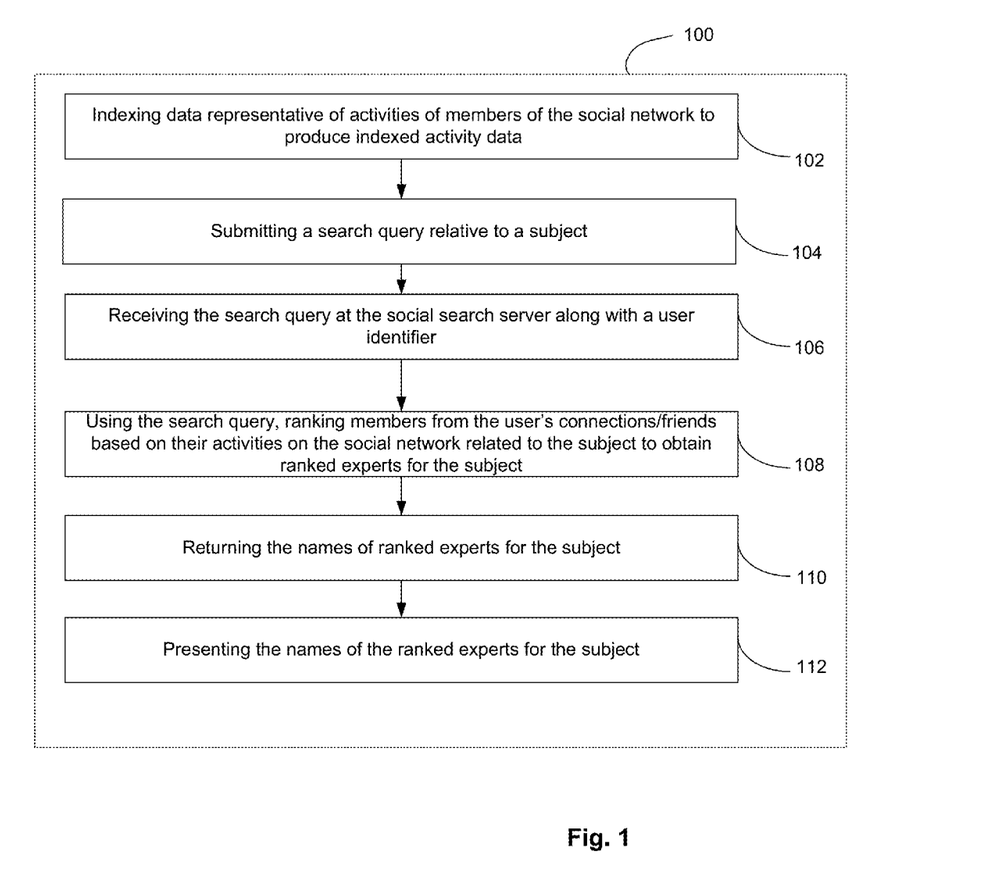
FIG. 1 is a flowchart of a method for obtaining names of ranked experts who are members of a social network in accordance with an embodiment.

Referring to FIG. 1, there is a shown an embodiment of a method 100 for obtaining ranked search results including names of ranked experts who are members of a social network and presenting the ranked search results to a user. The user performs a search from a user interface of a user device. In an embodiment, the search is performed using a search engine. The user is registered on the social network and has connections thereon.

In an embodiment, the method 100 is performed in the context where the user is registered on a plurality of social networks. The method therefore aggregates searchable web content (i.e., social data) from a plurality of social networks. The user is registered on one or more social networks and has connections (e.g., friends) thereon.

Method 100 comprises the steps outlined hereafter. At step 102, a social search server indexes data representative of activities of the members on the social network to produce indexed activity data. The indexing by the social search server is meant to include collecting, parsing, and storing of data available from the one or more social networks to facilitate fast and accurate information retrieval.

At step 104, the user submits a search query relative to a subject. At step 106, the social search server receives the search query relative to a subject along with a user identifier from the user device.

At step 108, the social search server, using the search query and the user identifier, ranks members from the user's connections/friends based on their activities on the social network related to the subject to obtain ranked experts for the subject.

At step 110, the social search server returns the names of ranked experts for the subject to the user device. At step 112, the user interface presents the names of ranked experts for the subject.

According to an embodiment, the search query is also received by a search engine server which returns customary search results. Furthermore, the step of presenting 112, on the user interface, comprises presenting the names of ranked members concurrently with the customary search results returned by the search engine.

According to an embodiment, the search engine is hosted on a website. Additionally, the data representative of activities of the members on the social network is obtained from the social network hosted on a website that is different from the website hosting the search engine.

According to an embodiment, the activities (as referred to as types of activities) of members on the social network comprise at least one of: posting, liking, commenting on, providing links, adding to or modifying profile information, living in a given location, sharing content, providing articles, and providing videos on the subject.

According to an embodiment, certain rules will regulate how ranking of the members will be presented on the user interface. In an instance, each of the activities is given a weight by type of activity whereby the ranking of the members will be influenced by the type of activity of the members. In another instance, each of the activities is given a weight by the recency of the activity relating to the subject whereby the ranking of the members will be influenced by the recency of the activities of the members relating to the subject.

In yet another instance, the activities of a member are given a weight according to at least one of the number of connection of the member on the social network and the number of pieces of content shared by the member and his connections. In still another instance, an online status of the members is monitored and the ranking of the members is influenced by the online status of the members. Using the knowledge of the online status of members enhances the probability that a question submitted by a user will be answered quickly.

According to an embodiment, the subject comprises a geographical location and the presenting comprises presenting the names of ranked members by type of recommendation for the geographical location. The type of recommendation may comprise, but is not limited to, at least one of dining, shopping, sights to see, product and venues to check out.

According to an embodiment, the step of performing a search comprises performing a search on the indexed data specific to the user's connections and on indexed data specific to connections of the user's connections (i.e., friends and friends of friends, FoF=Friends of Friends).

According to an embodiment, the step of indexing data 102 comprises indexing pieces of web content related to the users which includes, but is not limited to, photos, links, messages, comments, recommendations and/or videos.

According to an embodiment, the method 100 further comprises creating a reserved space on the user interface and presenting the names of ranked members in the reserved space. The creating a reserved space may take place at the website hosting the widget for the search engine. Alternatively, the creating a reserved space may take place on a web browser on the user interface.

The creation of a reserved space on the user interface may be performed in a variety of ways. On a browser on the user interface, a widget, added by one of an extension, a plug-in, app or an add-on loaded on the browser, can create the reserved space. The reserved space could also form part of a tool bar, search bar, side bar or notification window associated with the browser. Another way for creating a reserved space on the user interface is to publish a widget that can be installed by the owners of websites hosting search engines or other content publishing websites (so-called "Widget for Publishers"). For example, a news source (e.g., a "static web page") could install the widget on its website and a registered member of one or more social networks accessible by the widget would see what his connections have shared concerning the subject being displayed on a web page.

According to an embodiment, the method 100 further comprises creating an area on the user interface which displays a tool to ask a question about the subject to one or more of the ranked members. The tool may comprise at least one of a box for entering the name(s) or address(es) of the ranked members and a box for entering the question about the subject. The area may also be another window superimposed on the user interface.

According to an embodiment, the social network comprises a plurality of social networks and the indexing data step 102 thereby comprises indexing data representative of activities of members of the plurality of social networks.

According to an embodiment, the search results may be re-ranked according to different criteria which comprise at least one of: a connection of the user, a social network, recency, and relevancy. In a specific embodiment, relevancy is calculated using various pieces of information ("signals") such as title, description, URL, messages, comments, recency, etc. Different weights are associated to each piece of information. Other pieces of information include "social signals" such as how much interaction there is with a user on a social network wherein the greater the interaction, the higher the user's results will be ranked. Also, the greater a user's connection is ranked as an "expert" for the submitted search query, the higher the "expert" will be listed in the search results. A name of an expert (or social search result) may also be ranked based on how many times a link/content was shared on the social network.

The expert score represents a level of expertise of a member on a given subject. The expert score is based, among other things, on the volume of contribution and use of a social network as reflected by:

sharing links, articles, music, videos, etc.;
viewing and liking other people's links and comments;
posting new materials;
commenting on other people's content;
a members's content being re-shared by others (thereby confirming that the user is ‹good› for the subject);
recency of the activities by the member; and
uniqueness of content shared by a member; i.e., if a member only re-shares everything from his friends, he's probably not an expert, but if he posts unique/quality content which is then re-shared by his friends, he is most likely seen as an ‹influencer›.

Activity data includes all activities on a user's/member's own profile as well as profiles of his/her friends' profile or public pages (all within the social network).

Figure 2:
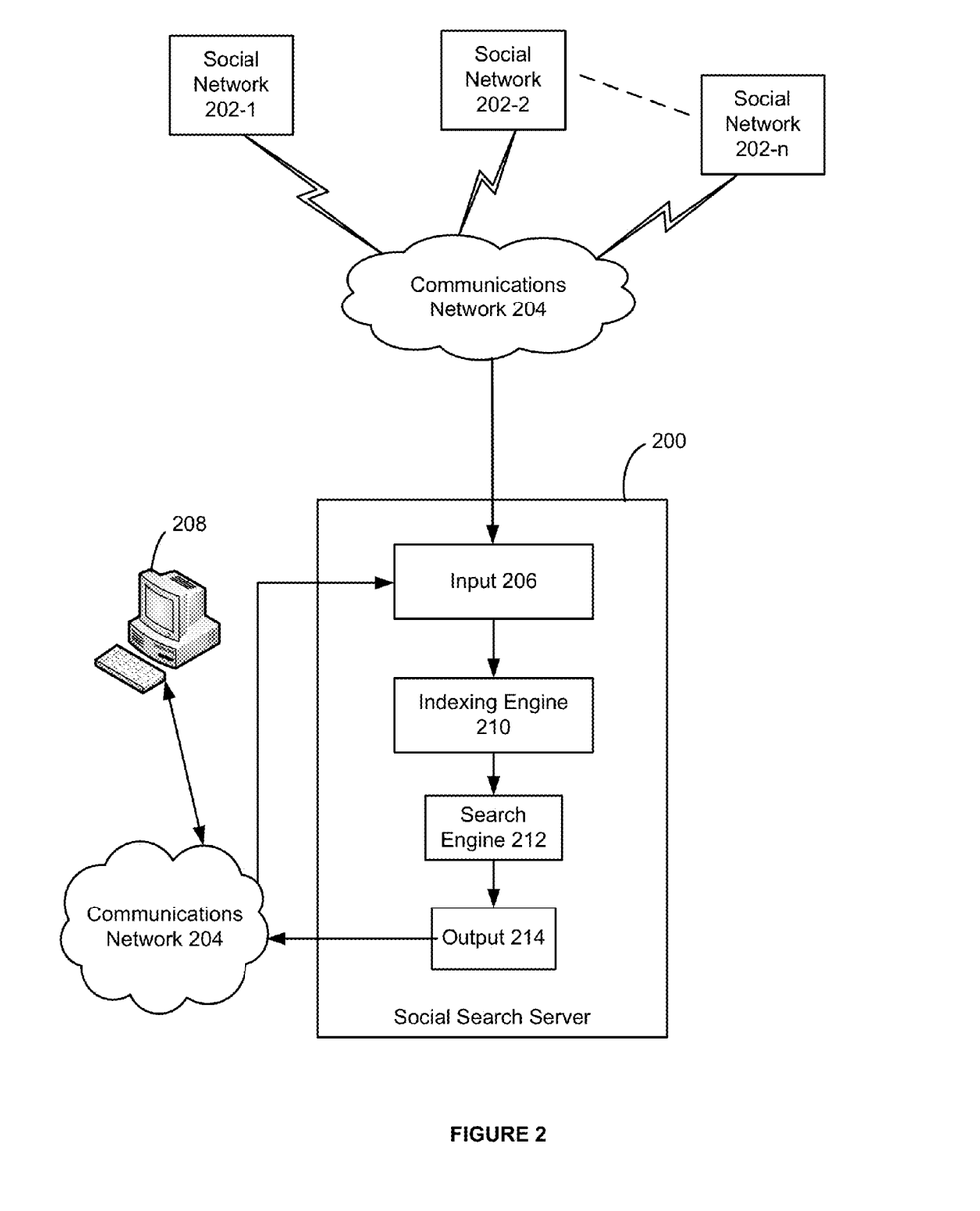
FIG. 2 is a block diagram of an exemplary social search server obtaining names of qualified experts who are members of a social network in accordance with an embodiment.

Now turning to FIG. 2, there is shown is a block diagram of an exemplary social search server 200 and its immediate operating environment for obtaining ranked search results including names of members of a social network and their most interesting content/posts according to the methods described herein.

According to an embodiment, the social search server 200 comprises an input 206, an indexing engine 210, a search engine 212 and an output 214. The social search server 200 may also include a database (not shown) or have access to an external database.

The input 206 is for receiving a search query from the user computer device 208 along with a user identifier. The indexing engine 210 is for indexing data representative of activities of the members on the social network to produce indexed activity data which can be stored in a database (not shown, internal or external to the social search server 200).

The search engine 212 uses the user identifier for finding indexed activity data specific to the user's connections. The search engine 212 uses the search query relative to the subject for determining the names of the members from the user's connections who are ranked in the subject of the search query, namely names of ranked members.

The output 214 returns to the user device, the names of ranked members to the user device for presentation on the user interface.

The social search server 200 obtains data concerning a user from one or more social networks 202 over a communication network 204 such as the Internet, or any other type of wired and/or wireless communication networks. Examples of social media networks include but are not limited to: Facebook, LinkedIn, Google Plus and Google related networks, Twitter, Foursquare, MySpace, email such as Gmail and Hotmail, etc. The data obtained from the social networks includes activity data such as sharing, commenting, liking/recommending, posting, etc.

The social search server 200 is also connected to the user computer device 208 over communication network 204. In general, the social search server 200 collects the data from the remote servers of the social networks 202, processes the data locally and then provides the results to the user computer device 208 over the communication network 204. In the case where the data is unstructured or semi-structured, e.g., HTML content such as for Google+, the social search server 200 scrapes the data from the remote servers of the social networks 202.

In an embodiment, the user of the user computer device 208 has to open an account and create a user profile with the social search server 200. The user may link their profile with the social search server 200 to one or more accounts at one or more social networks 202.

In an embodiment, the social search server 200 updates its content on a regular basis, e.g., real-time, daily and/or every time a user computer device 208 makes a request, to provide the user computer device 208 with real-time or nearly real-time results and recommendations.

Figure 3:
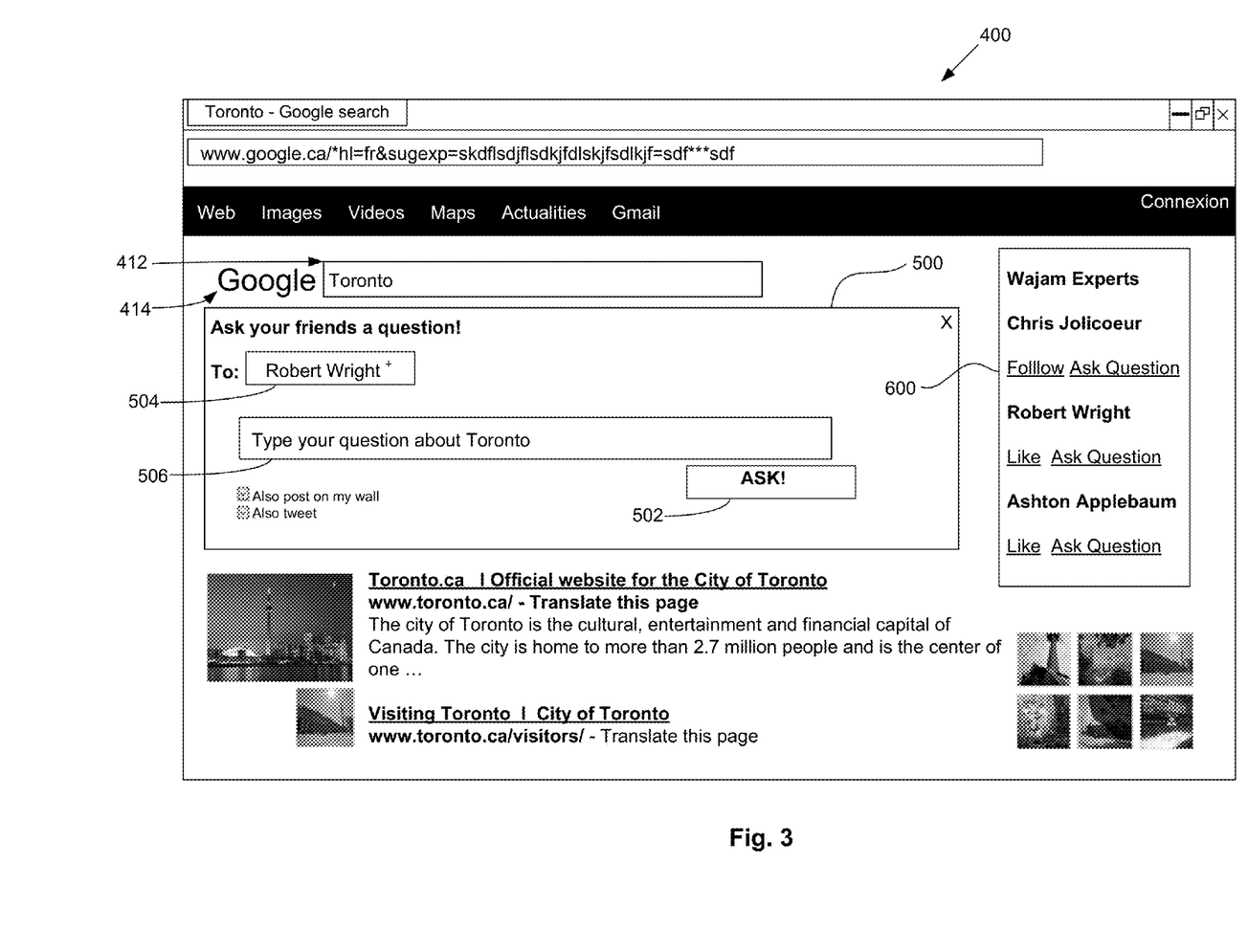
FIG. 3 is a screen shot of a web browser interface on which the method of FIG. 1 is embodied.

Now turning to FIG. 3, there is shown a screen shot of a web browser 400 implemented on the user computer device 208 (see FIG. 2). Examples of browsers include: Internet Explorer, Safari, Firefox, Google Chrome, Opera, etc.

The web browser 400 comprises a search query box 412 and provides access to a search engine 414. Examples of search engines include: Google, Yahoo!, Bing, etc.

The web browser 400 comprises a reserved space 600 for presenting the names of ranked members (also referred to as "experts"). The web browser 400 also provides the capability to select an expert (a user's friend) to whom a question can be asked. This capability is afforded by providing an area 500, on the user interface, which displays a tool to ask a question about the subject to one or more of the ranked members. The tool comprises at least one of a box 504 for entering the address of the ranked members and a box 506 for entering the question about the subject. Finally, the tool comprises a button 502 to send the question to the one or more ranked members.

Once the question is sent to one or many experts, the social search server 200 (see FIG. 2) monitors if an expert views the question and if the expert answers the question. This provides the capability of knowing that if a user/expert has not read a question after a given amount of time, the probability is high that he will not answer (especially if the expert is online and selected to ignore the question). In such a circumstance, the social search server can direct the question to someone else (second expert). The same applies if the user reads the question, but does not answer it, we can assume that he does not have the answer and, again, redirect the question to another expert in the user's network.

Figure 4:
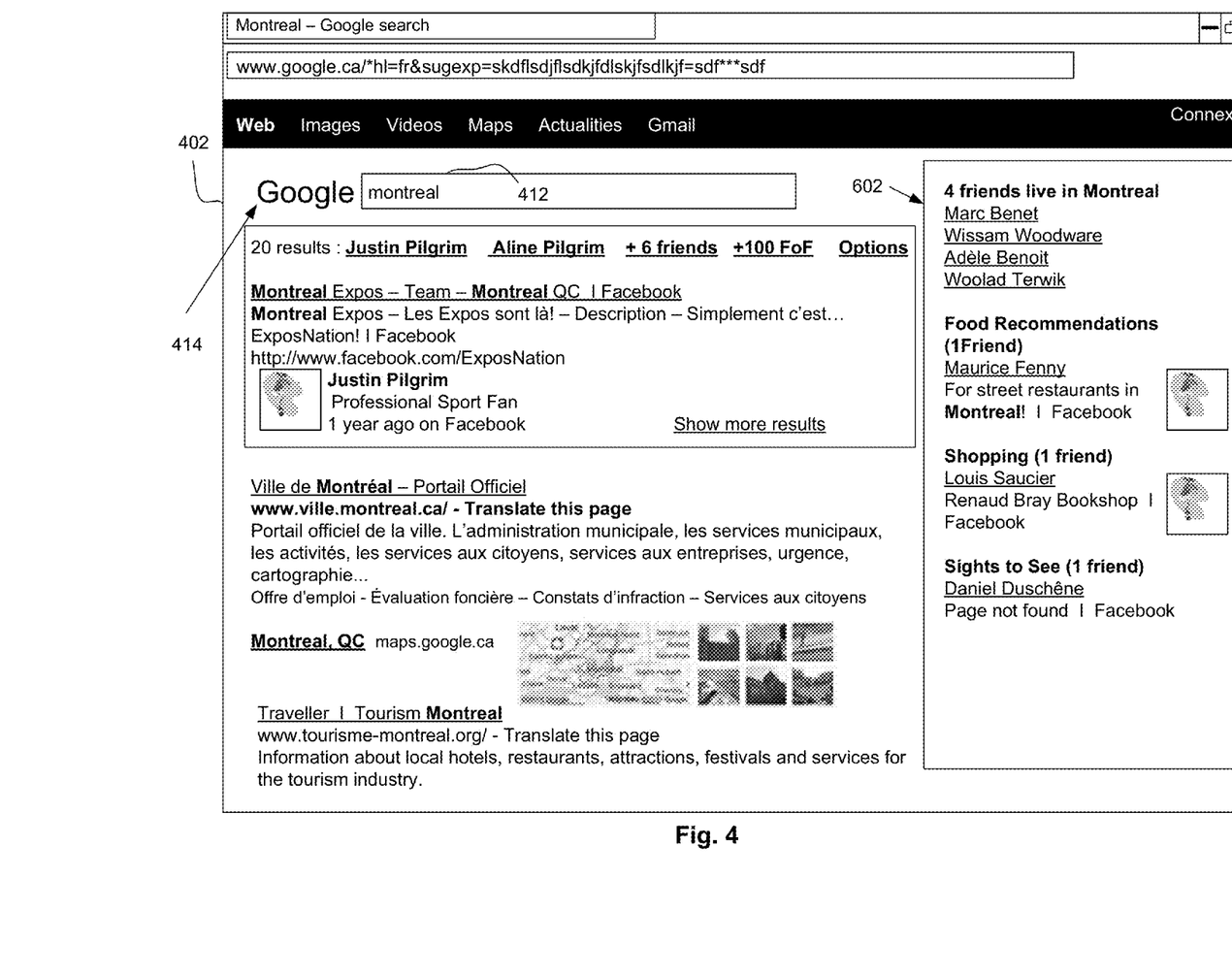
FIG. 4 is another screen shot of a web browser interface on which the method of FIG. 1 is embodied.

Now turning to FIG. 4, there is shown a screen shot of another web browser 400 implemented on the user computer device 208 (see FIG. 2). The web browser 402 comprises a reserved space 602 for presenting the names of ranked members where the subject of the search comprises a geographical location. The names of ranked members are presented by type of recommendation for the geographical location. The type of recommendation comprises, but is not limited to, at least one of dining, shopping, sights to see, products and venues to check out. The web browser 402 comprises a search query box 412 and provides access to a search engine 414.

Figure 5:
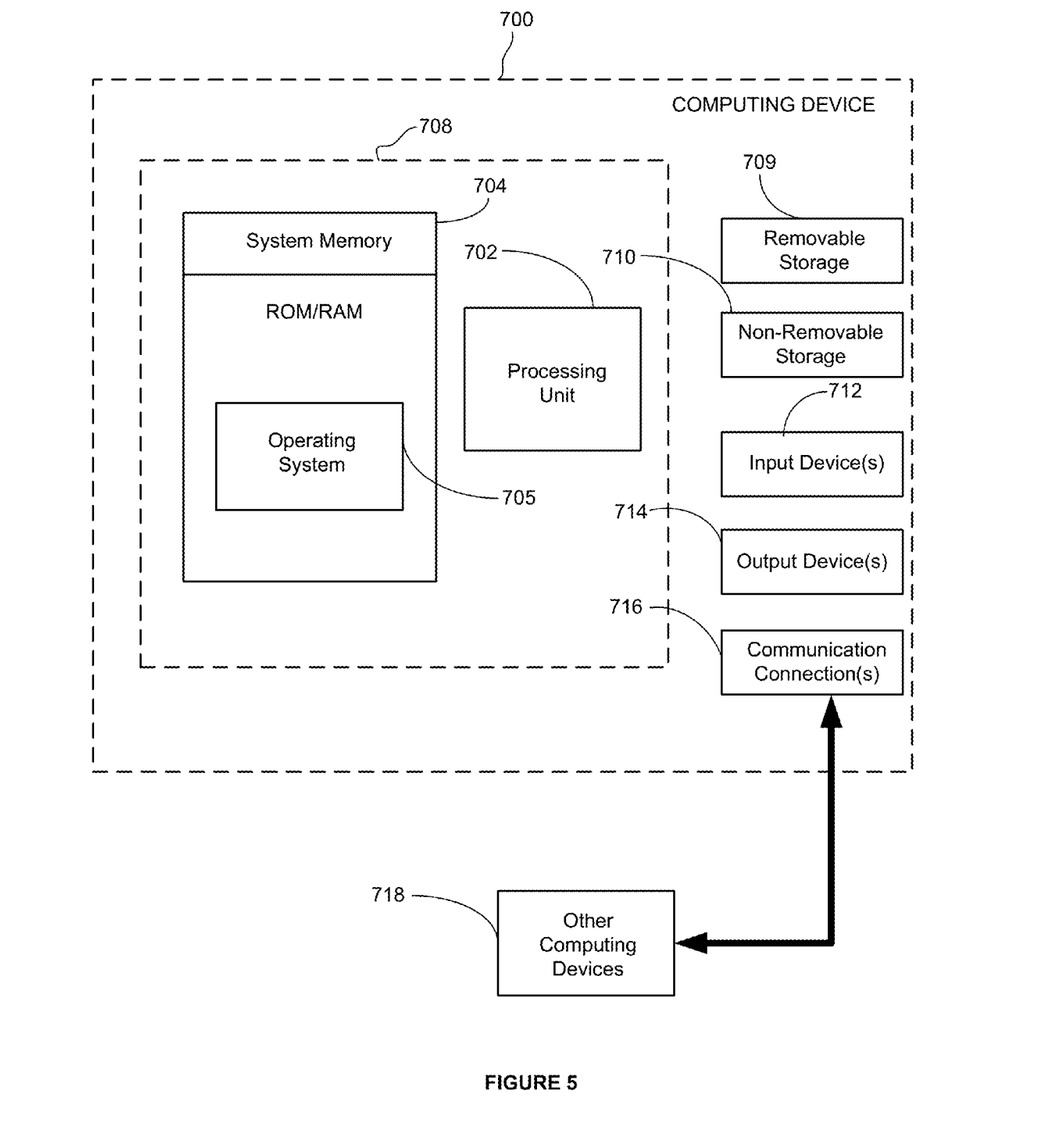
FIG. 5 illustrates a block diagram of an exemplary computing environment.

FIG. 5 and the associated discussion are intended to provide a brief, general description of a suitable computing environment in which embodiments of the social search server 200 and of the user computer device 208 (see FIG. 2) may be implemented. It should be noted that the user computer device 208 may include, but is not limited to, one of a desktop, a laptop, an IPad, an IPhone, a smart phone, or any computing device having an operating system which can implement the embodiments described herein.

With reference to FIG. 5, a block diagram of an example computing operating environment is illustrated, such as computing device 700. In a basic configuration, the computing device 700 may be a server providing management services associated with an extensible multi-tenant service and typically include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of a networked personal computer or a server (such as the social search server 200). This basic configuration is illustrated in FIG. 5 by those components within dashed line 708.

The computing device 700 may have additional features or functionality. For example, the computing device 700 may also include additional data storage devices (removable and/or non-removable) such as, for example, magnetic disks, optical disks, or tape. Such additional storage is illustrated in FIG. 5 by removable storage 709 and non-removable storage 710. Computer storage media may include volatile and non-volatile, removable and non-removable media implemented in any method or technology for storage of information, such as computer readable instructions, data structures, program modules, or other data. System memory 704, removable storage 709 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700. Computing device 700 may also have input device(s) 712 such as keyboard, mouse, pen, voice input device, touch input device, etc. Output device(s) 714 such as a display, speakers, printer, etc. may also be included. These devices are well known in the art and need not be discussed at length here.

The computing device 700 may also contain communication connections 716 that allow the device to communicate with other computing devices 718, such as over a wireless network in a distributed computing environment, for example, an intranet or the Internet. Other computing devices 718 may include server(s) that execute applications associated with a location service or other services. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators. These human operators need not be collocated with each other, but each can be only with a machine that performs a portion of the program.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A method for obtaining ranked search results including names of ranked experts who are members of a social network and presenting the ranked search results to a user performing a search from a user interface of a user device, the user being registered on the social network and having connections thereon, the method comprising:
   collecting, by a social search server, searchable data representative of different activities of the members of the social network, the social search server being connected to a server hosting the social network via a communication network, wherein the data being collected represent different combinations of: posting, liking, commenting on, providing links, living in a given location, sharing content, providing articles, and providing videos;
   indexing, by an indexing engine, the data representative of the different activities of the members on the social network to produce indexed activity data;
   receiving, by the social search server, a search query relative to a subject along with a user identifier from the user device;
   using the search query and the user identifier, ranking, by the social search server, members from only the user's connections based on their activities on the social network related to the subject to obtain the names of ranked experts for the subject, the ranking comprising assigning a weight to each different activity whereby the ranking of the members will be influenced by the different activities performed and the ranking assigned to each different activity;
   returning, by the social search server, the names of ranked experts for the subject to the user device; and
   presenting, on the user interface, the names of ranked experts for the subject.

2. The method of claim 1, wherein the search query is also received by a search engine server which returns customary search results and wherein the step of presenting, on the user interface, comprises presenting the names of ranked members concurrently with the customary search results returned by the search engine.

3. The method of claim 1, wherein each of the activities is given another weight by recency of the activity relating to the subject whereby the ranking of the members will be influenced by the recency of the activities of the members relating to the subject.

4. The method of claim 1, wherein the activities of a member are given a further weight according to at least one of the number of connection of the member on the social network and the number of pieces of content shared by the member.

5. The method of claim 1, wherein an online status of the members is monitored and the ranking of the members is influenced by the online status of the members.

6. The method of claim 1, wherein the subject comprises a geographical location and the step of presenting comprises presenting the names of ranked members by type of recommendation for the geographical location.

7. The method of claim 6, wherein the type of recommendation comprises at least one of dining, shopping, sights to see, products and venues to check out.

8. The method of claim 1, wherein the step of determining the ranked members comprises performing a search on the indexed data specific to the user's connections and on indexed data specific to connections of the user's connections.

9. The method of claim 1, wherein the step of indexing data comprises indexing pieces of web content related to the users comprising at least one of photos, links, messages, comments, recommendations, and videos.

10. The method of claim 1, further comprising creating a reserved space on the user interface and presenting the names of ranked members in the reserved space.

11. The method of claim 10, further comprising creating an area on the user interface displaying a tool to ask a question about the subject to one or more of the ranked members.

12. The method of claim 11, wherein the tool comprises at least one of a box for entering the name or address of the ranked members and a box for entering the question about the subject.

13. The method of claim 1, wherein the social network comprises a plurality of social networks and the step of indexing data thereby comprises indexing data representative of activities of members of the plurality of social networks.

14. A social search server for obtaining ranked search results including names of ranked experts who are members of a social network and presenting the ranked search results to a user performing a search from a user interface of a user device, the user being registered on the social network and having connections thereon, the social search server comprising:
   an input for receiving a search query relative to a subject along with a user identifier;
   an indexing engine for collecting searchable data representative of different activities of the members of the social network, the social search server being connected to a server hosting the social network via a communication network, wherein the data being collected represent different combinations of: posting, liking, commenting on, providing links, living in a given location, sharing content, providing articles, and providing videos, the indexing engine being adapted to index the data representative of the different activities of the members on the social network to produce indexed activity data;
   a searching engine using the search query and the user identifier, ranking the members from only the user's connections based on their activities on the social network related to the subject to obtain the names of ranked experts for the subject, the search engine being adapted to assign a weight to each different activity whereby the ranking of the members will be influenced by the different activities performed and the ranking assigned to each different activity; and
   an output for returning, to the user device, the names of ranked experts for the subject to the user device for presentation on the user interface.

15. A method implemented on a social search server for obtaining ranked search results including names of ranked experts who are members of a social network and presenting the ranked search results to a user performing a search from a user interface of a user device, the user being registered on the social network and having connections thereon, the method comprising:

collecting, by a social search server, searchable data representative of different activities of the members of the social network, the social search server being connected to a server hosting the social network via a communication network, wherein the data being collected represent different combinations of: posting, liking, commenting on, providing links, living in a given location, sharing content, providing articles, and providing videos;

indexing, by an indexing engine, the data representative of the different activities of the members on the social network to produce indexed activity data;

receiving a search query relative to a subject along with a user identifier from the user device;

using the search query and the user identifier, ranking members from only the user's connections based on their activities on the social network related to the subject to obtain the names of ranked experts for the subject, the search engine being adapted to assign a weight to each different activity whereby the ranking of the members will be influenced by the different activities performed and the ranking assigned to each different activity; and     returning the names of ranked experts for the subject to the user device for presentation on the user interface.

* * * * *